March 27, 1962 W. O. HARTUP 3,026,754
SHEET-METAL TRIMMING MACHINE
Filed Feb. 18, 1957 3 Sheets-Sheet 1
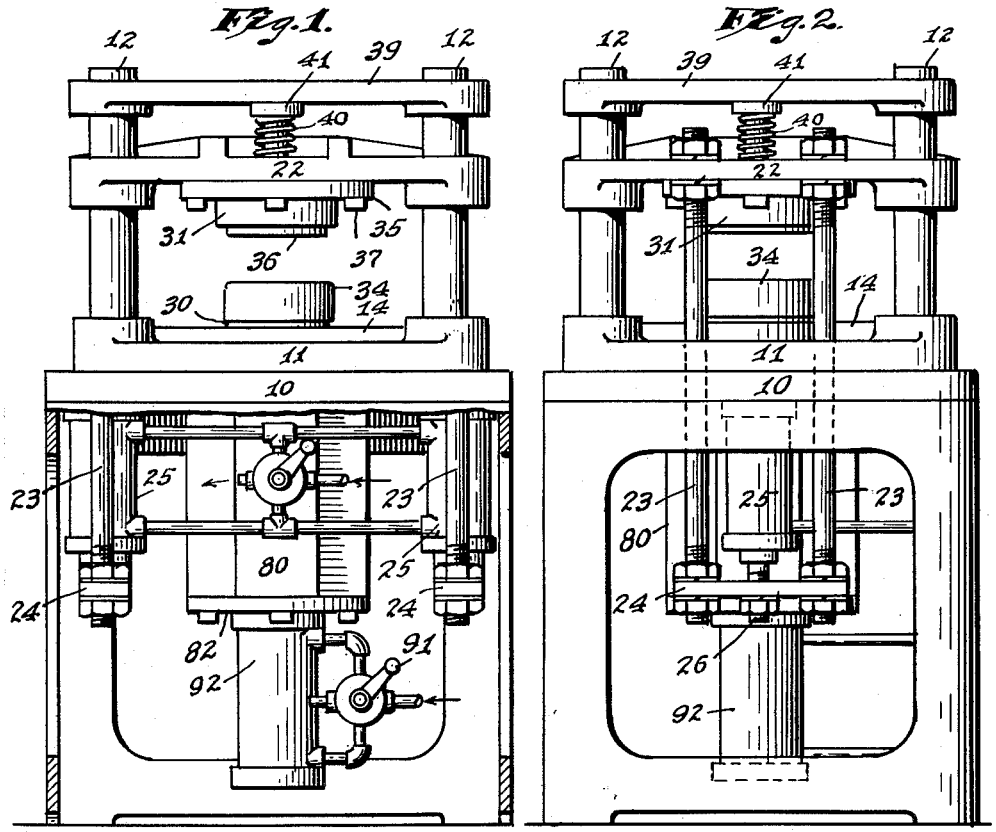
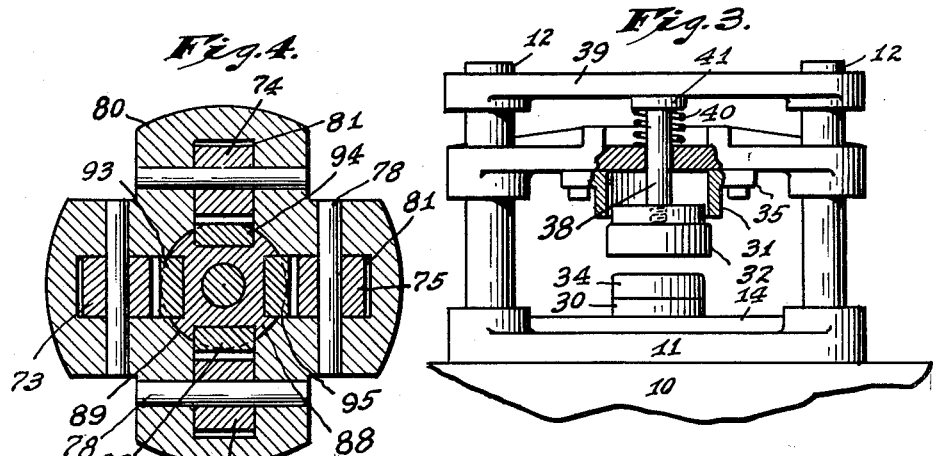
INVENTOR.
WILLIAM O. HARTUP,
BY
Schley, Frank & Jenkins
ATTORNEYS.

March 27, 1962 W. O. HARTUP 3,026,754
SHEET-METAL TRIMMING MACHINE
Filed Feb. 18, 1957 3 Sheets-Sheet 2
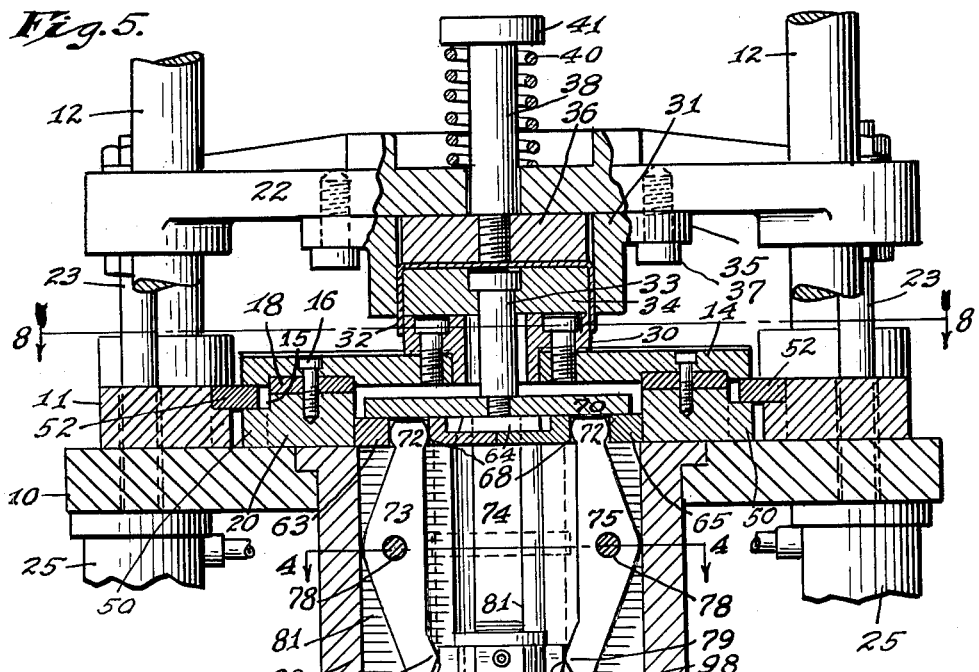
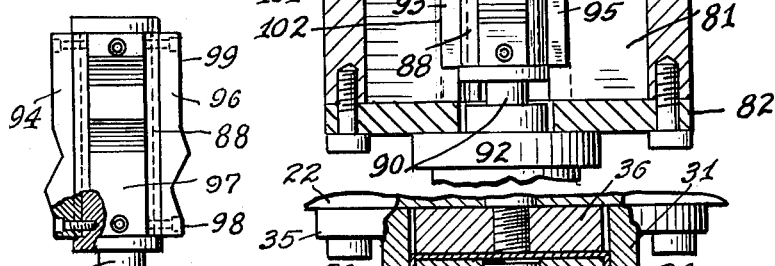
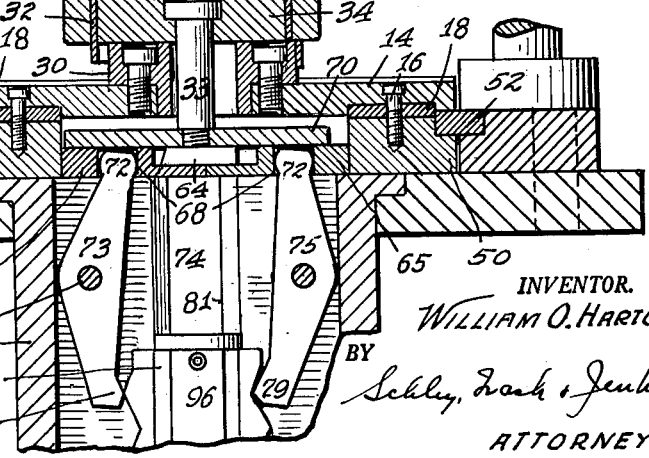
INVENTOR.
WILLIAM O. HARTUP,
BY
Schley, Zack & Jenkins
ATTORNEYS.

March 27, 1962 W. O. HARTUP 3,026,754
SHEET-METAL TRIMMING MACHINE
Filed Feb. 18, 1957 3 Sheets-Sheet 3

INVENTOR.
WILLIAM O. HARTUP,
BY
Schley, Leake & Jenkins
ATTORNEYS.

United States Patent Office 3,026,754
Patented Mar. 27, 1962

3,026,754
SHEET-METAL TRIMMING MACHINE
William O. Hartup, % Model Trimmer, Inc., 25th and Hawcreek, Columbus, Ind.; William A. Conner, executor of said William O. Hartup, deceased
Filed Feb. 18, 1957, Ser. No. 640,942
5 Claims. (Cl. 83—188)

This invention relates to a machine for operating on sheet-metal stampings, especially for trimming the walls of drawn parts.

Many sheet-metal parts, after being drawn or formed to their desired shape, then have their walls trimmed to provide edges of a desired contour, which may be continuous in a flat or curved plane, or may include notches or upstanding tabs. Supplementary cutting may also be done at or adjacent the trimmed edges by providing the trimming dies with suitable parts for this purpose.

My present invention, which is an improvement in the type of machine described and claimed in my previously issued patent, No. 2,521,974, issued September 12, 1950, has for its general object the provision of a self-contained machine, simple in construction and operation, and efficient in performing its work. It is my further object to provide a machine of sturdy construction having a minimum of wearing parts, which will require a minimum amount of power, which will cut and trim work pieces of relatively heavy wall thicknesses, and which will effectively break the trimmed scrap from said work-pieces to make it easily removable. It is an object of my invention to provide a trimming machine which will have a flexible operating cycle, which will be easily retooled to produce any desired sequential trimming order, which will operate at a high rate of speed and will produce a complete trimming cycle on each stroke without an idle return stroke, and which will lend itself to automatic feeding.

In a machine of the type to which my invention relates, a die-plate is mounted for lateral movement upon a table and carries one die of a pair of trimming dies. A companion die is carried by an upper-die holder which is movable to position the complementary die in working relationship with the die upon the plate and to raise that complementary die to open and close said dies for loading and unloading the work in the machine. This portion of the structure is similar to that in my previous patent.

In accordance with the present invention, the laterally-movable die-plate is associated with underlying thrust-transmitting and guiding means and is operated by levers below said plate; and the operating levers are driven in the same planes as the directional movements of the die-plate by cams movable in such planes in direction normal to said die-plate.

Preferably, there is a separate lever for each direction of die-plate movement, and the levers extend downward from the thrust-transmitting means, are pivoted intermediate their ends, and are activated by individual cams, each engaging the lower end of its associated lever. Desirably, these cams are replaceably mounted on a vertically-movable carrier or ram, so that they are jointly movable by suitable power means, conveniently a fluid-operated cylinder, and the cams are arranged to produce a complete trimming sequence of the die-plate on each stroke of the carrier or ram. I prefer to mount the cams and carrier centrally inside the levers; in which case the cams then thrust outward on the lower ends of the levers, and the top ends of the levers exert radially inward thrust forces, which are transmitted to the die-plate, but it is within the broad scope of my invention to mount said cams outside the levers to produce radially outward thrust upon said die-plate.

Preferably, there are four levers and cams, and four thrust-receiving faces on the die-plate; the levers are arranged in pairs with the levers of each pair acting inwardly with respect to the die-plate from diametrically opposite directions and with the two pairs on diameters perpendicular to each other. The thrust-receiving faces are in corresponding pairs respectively positioned perpendicular to the thrust-lines of the four levers, and thrust is transmitted to them from the lever by means of crossed slides. The cam members are also arranged in pairs with the members of each pair oppositely presented and with each cam member operating a single lever.

The cams selectively control and actuate the levers to cause translation of the die-plate. The directional sequence of translations of the die-plate depends upon the form and positioning of the cam elements upon the cam carrier, and any desired sequence can be obtained. Desirably, the cam arrangement is such that during each movement of each pair of levers, the other pair is held stationary so that its slides bear against their associated thrust faces as guides to limit the motion of the die-plate to linear motion in the direction of such thrust faces. Alternatively, or preferably in addition to such guides, fixed guides may be provided to ensure linear movements of the die-plate. The cam carrier is driven through its operating strokes by a suitable power means, conveniently a fluid-operating cylinder, and preferably produces a productive motion of the die-plate on each stroke.

The accompanying drawings illustrate my invention. In such drawings:

FIG. 1 is a front elevation of a trimming machine embodying my invention;

FIG. 2 is a slide elevation of the machine shown in FIG. 1;

FIG. 3 is a front elevation of the trimming machine with parts broken away to show the work-ejector mechanism;

FIG. 4 is a cross section taken on the line 4—4 of FIG. 5;

FIG. 5 is a vertical section of the machine of FIG. 1, taken on the vertical axis of the dies, with the die-plate in a central position;

FIG. 6 is a vertical section taken on the same plane as FIG. 5 and showing the die-plate at the end of its shearing motion to the right;

FIG. 7 is a side view of the cams and cam carrier shown in FIG. 5, taken at 90° from the plane of FIG. 5;

Figure 8:
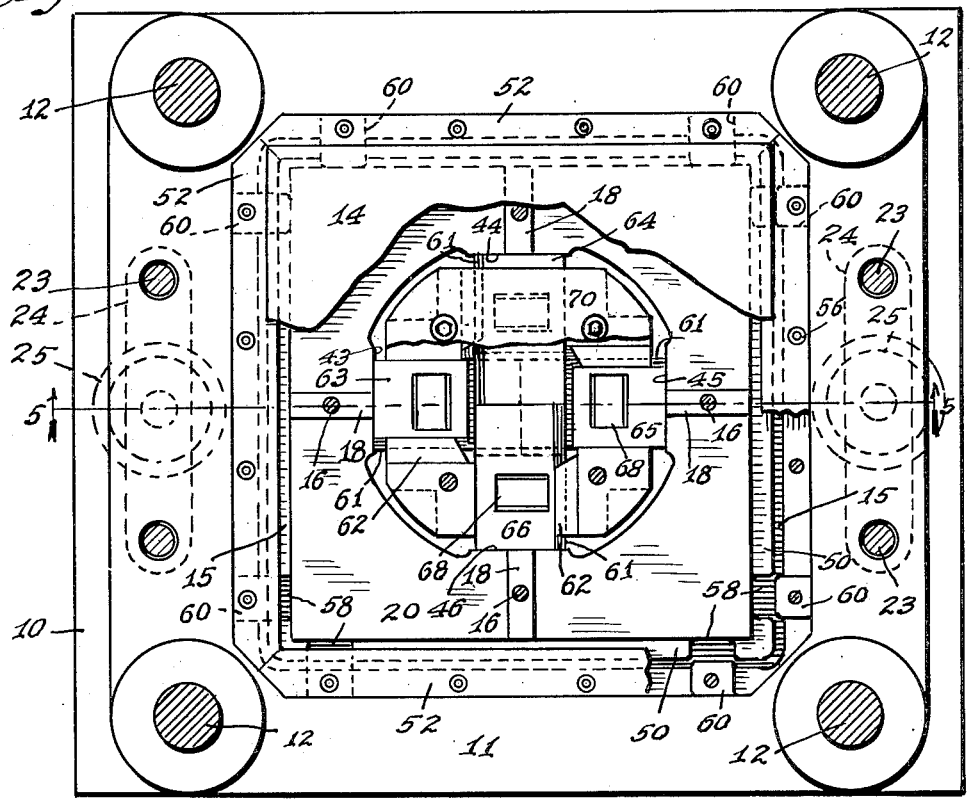
FIG. 8 is a horizontal section taken on the line 8—8 of FIG. 5, with parts broken away.

The machine shown in the drawings comprises a table 10 upon which is mounted a frame 11 which supports four vertical guide posts 12 at its corners. A die-plate 14 is supported on the table 10 within the frame 11 by means of an open rectangular thrust plate 20 which slidably rests on the table 10 and to which the die-plate 14 is fixed by bolts 16 and keys 18. Inward extending ribs 52 on the frame 11 engage in a groove 15 between the die-plate and the thrust plate, to hold the die-plate assembly down on the table 10. The die-plate 14 is thus held in slidable relation on the table 10 and is permitted limited sliding movement thereover.

An upper die carrier 22 is mounted for vertical movement on the guide posts 12 and is connected by draw bars 23 to lower cross-head members 24, below the table 10. A pair of power cylinders 25 having rams 26 are secured between the table 10 and the cross-head members 24 so that operation of said cylinders will raise and lower the upper die carrier 22. Suitable stops limit downward movement, to ensure proper shearing relation of the dies.

The inner die 30 of a pair of trimming dies is mounted on the die-plate 14, with a work-piece support 34 above it. The outer die 31 is mounted on the carrier 22, so that such outer die 31 may be brought down over a work-piece 32 carried by the support 34, into shearing relationship with the inner die 30, where sliding movement of the die-plate 14 across the table 10 will cause the lower die 30 to trim the depending edges of the workpiece 32.

The die-plate 14 and the lower die 30 are provided with central openings through which a lower work holder 34 is supported from a fixed bridge wall 70 carried by the table 10 within the central opening of the thrust plate 20. With the relatively small die shown, the openings are conveniently central, and the work holder support comprises a single central post 33. The lower work holder 34 is shaped to conform to the inside of the workpiece 32, and may slidably engage the top surface of the lower die 30.

The upper die 31 is mounted on the carrier 22 by means of a supporting ring 35 and suitable bolts 37. The upper die 31 has a central opening which closely fits the outside of the work-piece 32, and receives an upper work holder 36. The work holder 36 is vertically movable within the die 31 and the ring 35, and is retained within said die by a knock-out bar 38 which extends above the carrier 22.

When the two dies 30 and 31 are brought together, the holders 34 and 36 closely embrace the workpiece 32 to hold it in proper position for trimming. After the trimming operation, and when the upper die carrier rises toward the position shown in FIG. 1, the upper work holder 36 is forced downward with respect to the die 31, to eject the work-piece 32 from that die. Conveniently, this is accomplished by the knock-out bar 38 which is secured to the die holder 36 and projects upward beyond the carrier 22. A cross member 39 positioned above the knock-out bar 38 limits the upward movement of the knock-out bar and thus holds the upper work holder 36 stationary during the later part of the upward travel of the carrier 22, thereby ejecting the work-piece 32 as shown in FIG. 3. The upward movement of the carrier 22 is cushioned by the spring member 40 carried around the knock-out bar 38 between the carrier 22 and an upper head 41 on said knock-out bar.

In the trimming operation, the upper die 31 is held in fixed position, and the lower die 30 is moved relative thereto in a series of radial strokes from center, and is returned to center at the end of the cycle and preferably after each stroke. Such movement of the lower die is produced by moving the die carrier 14 and its supporting thrust plate 20.

As has been noted, the thrust plate 20 is mounted for limited sliding movement on the surface of the table 10, and the die-plate 14 and the lower die 30 are fixed to the thrust plate 20. The driving forces are applied from within the open rectangular thrust plate 20.

Figure 9:
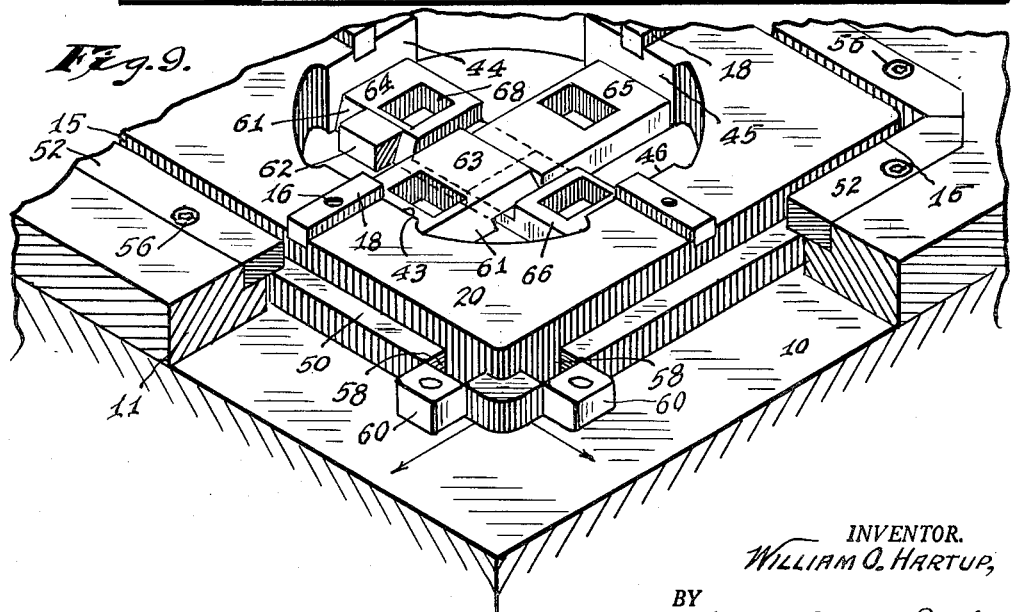
FIG. 9 is a fragmental isometric view showing the thrust plate and thrust-transmitting slides.

The thrust plate 20 has four inwardly-directed vertical thrust-receiving faces 43 to 46, arranged in pairs with the faces of each pair lying diametrically opposite each other and lying at right angles to the faces of the other pair. Thus, as is shown in FIGS. 8 and 9, the faces 43 and 45 lie opposite each other and at right angles to the pair of opposite faces 44 and 46.

The several thrust-receiving faces 43 to 46 are respectively abutted by thrust-transmitting slides 63 to 66, arranged in pairs corresponding to the pairs of thrust faces. In the arrangement shown, the thrust applied to each slide is transmitted across the center of the assembly, to the companion slide of its pair, and by that companion slide to the thrust face at the opposite side of the thrust plate 20. To permit this cross transmission of thrust, the two pairs of slides cross each other in a half-lap relationship. As appears in FIG. 9, the pair of slides 64 and 66 are cut away at their inner ends to half-thickness, and the half-thickness inner ends of the slides 63 and 65 overlie the half-thickness portions of the slides 64 and 66. The slides of each pair abut each other at their inner ends, and abut the thrust faces at their outer ends. By this arrangement, inward thrust on any slide is transmitted to its companion slide, and through that slide to the thrust face at the opposite side of the thrust plate 20. The several slides ride on the surface of the table 10, and are held thereagainst by the fixed bridge wall 70 which overlies them and is fixed to the table at its corner portions between the slides. To maintain a nice sliding fit of the slides, each is desirably provided with a beveled side face 61 engaged by a dovetail insert 62.

Each of the slides 63 to 66 is provided with a rectangular opening 68 to receive the head 72 of one of the driving levers 73 to 76.

The levers 73 to 76 are mounted in a casing 80 carried by the table 10 and extending downward therefrom. The casing 80 is formed internally to provide four angularly spaced longitudinal slots 81 which open toward the center line of the machine and which respectively receive the four levers 73 to 76. The levers are each pivoted at a midpoint on a cross pin 78 fixed in the casing 80. The upper arm of each lever carries a driving head 72 which pivotally fits in the opening 68 of the thrust slide to be driven by such lever. The lower arm of each lever carries an inwardly projecting toe portion 79 which serves as a cam follower. The levers move in the planes of the cross slides 63 to 66, and outward thrust on the cam follower 79 at the lower end of a lever will drive the head 72 radially inward to transmit thrust through a pair of slides to the opposite side of the thrust plate 20. If a pair of levers are held stationary, they will hold their associated pair of cross slides stationary to serve as guides for movement of the thrust plate in the direction of the planes of the thrust faces engaged by such slides.

A cam carrier 88 is slidably mounted in the casing 80, and is arranged to be reciprocated vertically past the cam followers 79 of the levers 73—76. The cam carrier 88 carries four longitudinal cam bars 93 to 96 at angularly spaced positions about its periphery, in position to be engaged by and to actuate the cam followers 79 of the levers. As is best shown in FIG. 4, the cam bars 93 and 96 are carried in longitudinal slots in the cylindrical surface of the cam carrier 88, and the portions of the cylindrical surface between such longitudinal slots form bearing lands 89 which have bearing engagement with corresponding inner cylindrical surfaces of the casing 80. The cam carrier is driven through vertical strokes by suitable driving means. As shown, the carrier is connected to the piston rod 90 of a power cylinder 92 carried by the bottom cover plate 82 of the housing 80. As shown, the power cylinder 92 is controlled by a manual control valve 91.

The cams 93—96 are formed to give the desired sequence of radial strokes to the lower die carrier assembly 14—20, to bring the parts to centered positions at the desired times, and desirably also to hold certain thrust slides 63—66 as guides for movement actuated by other slides.

One desirable cam arrangement is shown in FIGS. 5 and 7. The top and bottom end of each cam is formed as a dwell 98, so that when the cam carrier is at the end of its stroke in either direction, the parts are all centered. The upper halves of the cams 94 and 96 are formed as dwells 99, to hold the levers 74 and 76 against pivotal movement, and thereby to hold the slides 64 and 66 in fixed positions, as guides for movement of the plate 20 as driven by the levers 73 and 75 and the slides 63 and 65. To effect such movement, the cam 93 engaging lever 73 is provided with a rise 100 followed by a low 101, while the companion cam 95 engaging lever 75 is provided with a low 110 followed by a rise 111. Accordingly, upon movement of the cam carrier 88 upward from the position shown in FIG. 5, the lever 73 will be pivoted clockwise by the cam rise 100, while the companion lever 75 will be permitted to pivot clockwise by the low 110. The head 72 of the lever 73 will drive the thrust slides 63 and 65 to the right, and move the thrust plate 20, and thereby move the die carrier 14 and the lower die 30 to the right, to the position shown in FIG. 6. Such movement produces a shearing action of the dies, to trim that portion of the work-piece which lies in the path of movement.

Upon further upward movement of the cam carrier 88, the rise 111 will drive the levers 73 and 75 and the slides 63 and 65 to move the thrust plate in an opposite radial direction, to the left in FIG. 5, to produce an opposite shearing stroke of the lower die 30. When these motions are completed, the cams 93 and 95 will return the levers 73 and 75 and the slides 63 and 65 to centered position, and during further upward movement of the cam carrier 88, the lands 102 of the cams 93 and 95 will hold such parts in centered position, where the thrust members 63 and 65 will serve as guides for movements at 90° to the movements just described. Such 90° movements will be effected in a corresponding manner by the cams 94 and 96, the levers 74 and 76, and the thrust slides 64 and 66.

The cam arrangement shown will thus produce a series of radial strokes of the lower die 30, and will return the die to center position after each stroke. The sequence of stroke direction may be described as east, west, north, south. By suitable selection and arrangement of the cam elements, any desired sequence of stroke directions can be obtained, and by omitting appropriate cam elements, a stroke in any particular direction may be omitted.

In the device as so far described, the movements of the thrust plate 20 in any particular direction are guided by holding stationary the thrust slides lying at right angles to that direction of movement. Desirably, additional guiding means is provided, as shown in FIGS. 8 and 9. As has been described, the thrust plate 20 is slidable on the table 10 and has at its periphery a flange 50 which underlies the hold-down ribs 52. At points adjacent the corners of the thrust plate 20, the flange 50 is interrupted to form guide slots 58 whose side walls lie normal to the side face of the flange. A rectangular guide post 60 is fixed to the table 10 opposite each guide slot 58. When the thrust plate 20 moves in a direction toward a guide post 60, such guide post 60 is received between the side walls of the guide slot 58 to limit the movement to linear movement. The flange 50 at each adjoining side of the thrust plate 20 rides past the inner faces of its associated guide posts 60. Thus, while the set of guide posts 60 at one side of the thrust plate 20 enter the slots 58 as guides, the guide posts at the adjoining sides of the plate 20 effect guiding by engaging the edge faces of the flange 50. The thrust plate 20 and die-plate 14 and die 30 which it carries are thus held to linear movements in radial directions at right angles to each other from the center line of the machine. The radial planes of such movement directions are also the planes of movement of the cams 93—96, the levers 73—76, and the slides 63—66.

Operation of the machine is as follows:

The upper die carrier is assumed to be in raised position, as shown in FIG. 1, so that the dies are open. A sheet-metal stamping 32 is placed on the lower work holder 34 in proper relative position over the lower die 30. The power cylinders 25 are then operated to lower the upper die carrier 22 to bring the upper work holder 36 into engagement with the upper surface of the work-piece and to bring the upper die 31 downward into a shearing relationship with the lower die 30.

The power cylinder 92 is now operated to move the cam carrier 88 through a full stroke, for example, upward from the position shown in FIG. 5. This causes the cams 93 to 96 to actuate the levers 73 to 76 to produce successive radial movements of the die-plate 14 across the table 10, as set forth above, to carry the lower die 30 through a complete cycle of trimming movements with respect to the stationary upper die 31. These movements produce a complete trim of the work-piece 32 during the single upward stroke of the cam carrier 88. The upper die is now raised, by operation of the power cylinders 25. As the upper die 31 rises, the work-piece 32 will normally remain within it and be carried upward with it. As the die carrier 22 approaches the upward limit of its travel, the head 42 on the knock-out bar 38 will engage the fixed cross member 39, which will stop further vertical movement of the upper work holder 36 and the work-piece 32. Continued upper movement of the carrier 22 will carry the die 31 upward with respect to the work-piece 32, and cause that work-piece to drop out of the die 31.

The machine is now reloaded with another workpiece 32, the power cylinders 25 operated to lower the upper die 31, and the power cylinder 92 operated to move the cam carrier 88 through a stroke in the opposite direction. Such opposite stroke produces a full productive sequence of radial movements of the lower die, in a reverse order from that occurring during the upward stroke.

With the cams shown, and assuming an upward stroke of the cam carrier, the die-plate 14 is first moved successively in diametrically opposite directions along the thrust line of levers 73 and 75. It is then centered, and is then moved successively in diametrically opposite directions along the thrust line of the levers 72 and 74 at right angles to the first movement. Movement of the cam carrier 88 through a downward stroke will produce a similar sequence of movements of the die-plate 14, but in the reverse order from that of the upward stroke. The cams shown can readily be replaced by others to produce any desired sequence of die movements, and movement in any particular direction can be avoided by eliminating the rise and lows on the cam engageable with the lever which provides thrust in such direction.

The machine may be loaded and unloaded manually, and its two power cylinders 25 and 92 may be operated by manual controls. But the machine readily adapts itself to automatic loading and unloading, and whether the loading operations are manual or automatic, the power cylinders 25 and 92 may be operated by interlocking or automatic controls. Such cylinders may be operated hydraulically, or conveniently by compressed air, and may be replaced with other power mechanism as desired. The dies 30 and 31 are readily inter-changeable with other pairs of dies, to trim a wide variety of stampings. Such dies may be either smaller than those shown, or may be larger, up to the limit of the area of the die plate. When desired, the die-plate 14 itself may readily be removed, without disturbing other operative parts of the machine. The dies used in the machine may be trimming dies, or dies which both trim and slit or punch edge portions of the work, and any such dies may be provided with means to do minor forming operations on the work, in accordance with known practice, but with substantially greater liberty than in prior machines. The machine parts are arranged for effective lubrication, for example, the casing 80 containing the levers and cams may be filled with lubricant. The machine is inherently quiet and smooth in operation, so that its parts and dies used with it are subjected to minimum wear.

I claim as my invention:

1. A machine for operating upon the walls of sheet-metal stampings, comprising a die-plate movable in a fixed horizontal plane, a complementary die holder, a thrust plate engaging said die-plate for moving the same, a plurality of pairs of levers in thrust-transmitting relationship with said thrust plate, the levers of each pair being diametrically opposite each other in a common plane, the plane of each pair being at right angles to the plane of another pair, a cam carrier vertically movable below the die plate and positioned substantially on the vertical axis of the die plate and between the levers, a plurality of pairs of opposed cams on said carriage and acting outwardly on the lower ends of the levers to force their upper ends radially inward, a plurality of crossed slides engaged by the upper ends of said levers for transmitting the radial movements thereof to the die plate, and means to drive the carrier through vertical movements, said cams being operable upon vertical movement of said carrier to selectively operate the die plate successively in a plurality of radial directions.

2. A machine for operating upon the walls of sheet-metal stampings, comprising a die-plate movable in its plane, a complementary die holder, a rectangular thrust plate operatively connected to said die-plate and having inwardly presented thrust faces arranged in opposite parallel pairs at right angles to each other, a plurality of crossed slides engaging said thrust faces in face-to-face thrust relation and crossing each other on the vertical axis of the die-plate, pairs of opposed levers having upper arms received in openings formed in said slides between said vertical axis and said thrust faces and operative to selectively thrust said slides inwardly to move the die-plate outwardly in a plurality of radial directions with respect to said vertical axis, said levers being spaced about said vertical axis and having lower arms substantially below said die-plate and adapted to be thrust outwardly, a cam carrier movable on said axis below the die-plate, and cam means on said carrier for selectively exerting outward thrusts on said lower lever arms.

3. A machine for operating upon the walls of sheet-metal stampings, comprising a die-plate movable in a fixed horizontal plane, a complementary die holder, a thrust-plate operatively connected to said die-plate for moving the same and having inwardly presented thrust-receiving faces, a plurality of crossed slides in thrust-transmitting relation with said faces, a pair of levers for each slide, the levers of each pair being pivoted on horizontal axes below said thrust plate and positioned diametrically opposite each other in a common plane, said levers of each pair having upper ends in thrust-transmitting relation with their related slide and having downward-extending lower ends, a cam carrier vertically movable below the die plate between the levers, a pair of cams on said cam carrier for each pair of levers and operable upon vertical movement of said carrier to act outwardly on the lower ends of the levers to cause their upper ends to act radially inward on their related slide, and means to drive the carrier through vertical movements, said cams being operable upon vertical movement of the carrier to operate said levers to thrust said die plate successively in a plurality of radial directions.

4. A machine for operating upon the walls of sheet-metal stampings, comprising a die-plate movable in a fixed horizontal plane, a complementary die holder, thrust-transmitting mechanism operatively connected to said die plate for moving the same in radial directions from its central vertical axis, said mechanism including means forming a plurality of pairs of diametrically opposite thrust-receiving faces disposed to receive radially inward thrust and to move the die plate radially in the direction of thrust, a pair of levers for each pair of thrust-receiving faces, the levers of each pair being pivoted on horizontal axes below said thrust-transmitting mechanism and positioned diametrically opposite each other in a common plane, the levers of each pair having upper ends engaged in thrust-transmitting relation with their related pair of thrust-receiving faces and having downward extending lower ends, a cam carrier vertically movable on said central axis below the die plate and between the levers, a pair of cams on said cam carrier for each pair of levers and operable upon vertical movement of the carrier to act outwardly on the lower ends of the levers to cause radially-inward thrust movement of their upper ends against the thrust-receiving faces of said thrust-transmitting mechanism, and means to drive the carrier through vertical movements, said cams being operable upon vertical movement of the carrier to actuate said levers and mechanism to thrust said die plate successively in a plurality of radial directions.

5. A machine for operating upon the walls of sheet-metal stampings, comprising a table, a die plate movable on said table, a complementary die holder, a thrust plate in operative engagement with said die plate, a casing mounted on said table and extending downward therefrom, a plurality of levers equally spaced in said casing about the central vertical axis of said die plate and pivotally mounted on horizontal axes below said table for movement in radial planes about said vertical axis, said levers having upper actuating arms extending through the plane of said table and arranged to exert thrust radially of said central axis, thrust transmitting means between said arms and the thrust plate for actuating the thrust plate and die plate in radial directions in the planes of the levers, a cam carrier movable within said casing on said vertical axis below said die plate, means to drive said carrier through vertical movements, a plurality of cam means on said carrier engaging said levers and operable upon vertical movement of said carrier to selectively actuate said levers for selectively moving said die plate in a sequence of radial directions in the planes of the levers, said cam means being movable within the vertical extent of the levers, and guide means on said table engaging said thrust plate for guiding the directional movement of said plate on said table.

References Cited in the file of this patent

UNITED STATES PATENTS

| | | |
|---|---|---|
| 199,546 | Hill | Jan. 22, 1878 |
| 1,717,612 | McNeil | June 18, 1929 |
| 2,413,980 | Liss et al. | Jan. 7, 1947 |
| 2,521,974 | Hartup | Sept. 12, 1950 |
| 2,521,975 | Hartup | Sept. 12, 1950 |
| 2,527,325 | Myers | Oct. 24, 1950 |
| 2,570,919 | Clifford | Oct. 9, 1951 |
| 2,669,302 | Brehm | Feb. 16, 1954 |

FOREIGN PATENTS

| | | |
|---|---|---|
| 14,344 | Great Britain | June 18, 1909 |
| 544,929 | Germany | Mar. 2, 1932 |
| 731,069 | Germany | Feb. 1, 1943 |
| 750,447 | Germany | Dec. 21, 1944 |